Dec. 10, 1940.    L. W. W. MORROW    2,224,484
HIGH VOLTAGE INSULATED CABLE
Filed Jan. 25, 1938
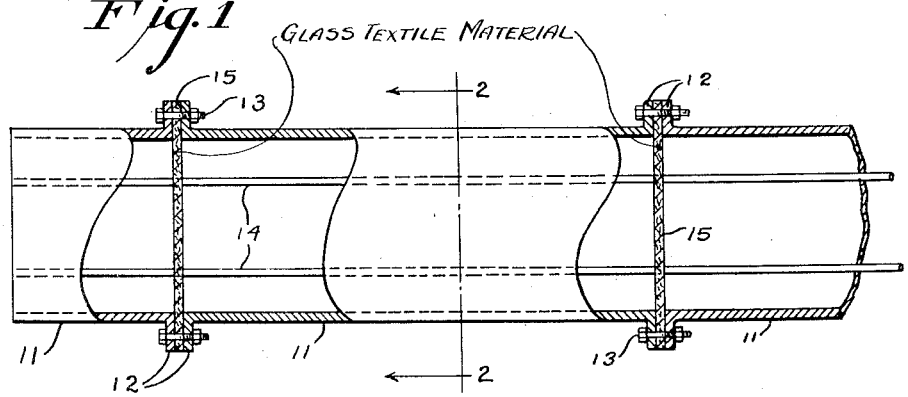
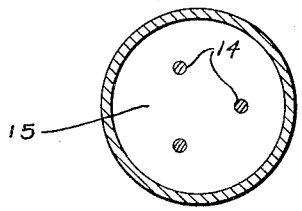
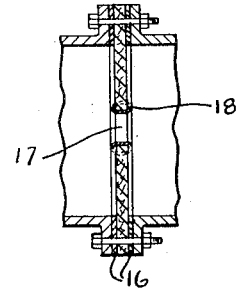
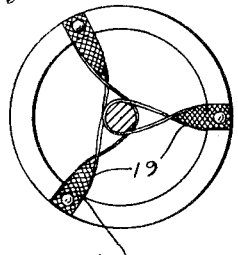
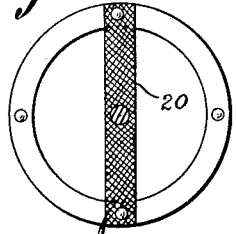
INVENTOR.
LESTER W.W. MORROW
BY Dorsey, Cole & Garner
ATTORNEYS.

Patented Dec. 10, 1940

2,224,484

UNITED STATES PATENT OFFICE 2,224,484

HIGH VOLTAGE INSULATED CABLE

Lester W. W. Morrow, Corning, N. Y., assignor, by mesne assignments, to Owens-Corning Fiberglas Corporation, Toledo, Ohio, a corporation of of Delaware Application January 25, 1938, Serial No. 186,893

8 Claims. (Cl. 174—28)

This invention relates to insulated conductors for use in high voltage circuits and more particularly to a cable construction in which oil is relied upon as the insulating medium.

It is well known that oils are among the best dielectric substances available and various attempts have been made to utilize oil as the insulation about electrical conductors in high voltage transmission networks. These attempts have taken the form of a closed conduit filled with oil within which is positioned the conductor. In some instances the conductor has been wrapped with fabric insulation and allowed to rest on the bottom of the conduit while in others it has been supported on spaced insulators which raise it out of contact with the conduit. In still others the entire space between the conduit and conductor has been filled with porous insulation which is connected to a source of oil under pressure.

Each of the above types of oil insulated conductors have been found to have certain inherent weaknesses. Where fabric insulation has been used the fabric has been found to have a tendency to absorb moisture. This is a cumulative phenomena and results in ultimate saturation of the fabric and consequent reduction in the dielectric strength of the composite insulation. When bare conductors are used and are supported on conventional insulators a number of relatively short leakage paths are built into the structure which materially reduces its efficiency. Furthermore, it has been found that moderate distortion of the external casing during installation or subsequent service may result in fracture of the insulators and failure of the conductor.

The object of this invention is an improved system of insulation between the conductor and casing of an oil insulated conductor which will be flexible, moistureproof and of such nature as to present only discontinuous leakage paths between the conductor and casing.

This system of insulation features the use of a sectional casing within which the conductor is supported by means of moisture impervious fibrous material held between the sections of the casing. Further features of the invention will be apparent from the following detailed description.

In the drawing:

Fig. 1 is an elevation partially in section, of an assembly of conductor and casing;

Fig. 2 is a section thru the casing on line 2—2 of Fig. 1;

Fig. 3 is a sectional elevation showing details of the insulating support;

Fig. 4 is an elevation showing a modification of the insulating support; and

Fig. 5 is an elevation showing a further modification of the insulating support.

Referring in more detail to the subject matter of the above drawing, the structure of the present invention comprises an outer casing which is made up of individual sections 11 of convenient length. While these sections of casing are preferably fabricated from metal they may be made of wood or any other suitable material. In the preferred form which has been shown, the metal sections 11 are provided with flanges 12 which are fastened together with bolts 13. Between these flanges are fastened the insulating members which are provided to support the conductors 14 in spaced relation with the casing 11. In the preferred form this insulating member 15 takes the form of a disc of textile material which is fabricated solely from fine filaments of glass. Such a disc has substantially the diameter of the flanges 12 and is held in position by being clamped tightly therebetween. By impregnating the marginal portion of the disc with latex or some similar resilient material as shown at 16 in Fig. 3, the glass filaments may be protected from crushing when flanges 12 are drawn tightly together. One or more holes 17 of the proper diameter and spacing are provided for passage of the conductor or conductors. The edges of these holes may be bound with glass roving 18 as shown in Fig. 3 to prevent fraying of the fabric as the conductors are drawn therethru.

Fig. 4 shows an alternative use of glass fabric in supporting a conductor within a conduit. Tapes 19 of woven fibrous glass are wound around the conductor and fastened to the flanges by the connecting bolts. Such a structure may be used when only a single conductor is placed within the conduit and has the advantage of ease of assembly in the field. The ends of these tapes may be impregnated with latex to protect the glass fibres as in the case of the disc 15. A slightly different modification is shown in Fig. 5 in which a single glass tape 20 is used as the insulating support, the conductor passing thru a hole in the tape as in the case of the fabric disc.

It has been found desirable in each of the structures disclosed, and particularly when tapes are employed as in Figs. 4 and 5, to seal the joints between flanges and around the bolts 13 by welding. When this is done an oil tight structure may be obtained with a much lower pressure on the insulating support between the flanges and the possibility of crushing the glass fibres is correspondingly decreased. It has been found that this welding may be done either with an arc or a gas flame without damage to the glass fabric.

The structure of the present invention has been found to have many desirable characteristics. Since the fabric by which the conductor is supported is formed exclusively from glass it has a dielectric constant as high or higher than the oil which fills the remainder of the conduit and the tendency of the insulation to break down at the points of conductor support is substantially eliminated. The high tensile strength of the fabric and its flexibility eliminate all chance of failure of the conductor supports due to distortion and shock encountered during either installation or service. The filaments from which the fabric is made are wholly impervious to moisture eliminating entirely one of the most prevalent sources of cable breakdown while the extreme surface area of the individual fibres and the discontinuity of contact between fibres in the fabric results in extremely low leakage losses thru the material. Furthermore, glass fibres of small diameter appear to have an especial affinity for oil and are very easily wet thereby, resulting in very complete penetration of the fabric by the insulating oil and further improvement in the dielectric characteristics of the structure as a whole.

In use it has been found that the external casing may be grounded in which case it may, if desired, be used as a grounded return circuit. On the other hand, the conduit may be supported on insulators in which case the conduit may form the outer conductor of a concentric cable. Since the fibrous glass of the textile material may be made from such glasses as are disclosed in Taylor Patent No. 1,815,812, it is apparent that a concentric cable of unusually high dielectric strength at radio frequencies is readily available.

While a preferred form of the invention has been described in detail, it is to be understood that modification and substitution are to be permitted within the scope of the appended claims.

It is to be understood that the term "textile" as used herein is intended to cover all fabricated bodies of glass fibres whether woven, knitted, felted or mechanically arranged while the term "oil" as used above and in the appended claims is intended to cover all liquid dielectrics having an oleaginous character including those oils which have been treated by addition or combination to inhibit combustion.

I claim:

1. In an oil insulated electrical conductor structure, a sectional conduit, a body of oil within said conduit, a conductor extending thru said conduit, a series of spaced glass textile members thru which said conductor passes, said textile members extending across said conduit and supporting said conductor in spaced relation therewith.

2. In an oil insulated electrical conductor structure, a sectional conduit, a body of oil within said conduit, a conductor extending thru said conduit and a series of spaced glass textile members positioned between adjacent sections of said conduit and supporting said conductor out of contact with said conduit.

3. In an insulated conductor structure, a conductor, a body of oil surrounding said conductor, a conduit confining said oil, said conduit comprising a series of flanged pipe sections, a body of woven glass textile substantially the same diameter as the flanges and positioned therebetween so as to extend across the interior of the conduit, that portion of the glass textile which is in contact with said flanges being impregnated with a resilient material, said conductor passing thru said textile material in spaced relation to the wall of said conduit.

4. In an insulated conductor structure, a conductor, a body of oil surrounding said conductor, a conduit confining said oil, said conduit comprising a series of flanged pipe sections, a body of woven glass textile of substantially the same diameter as the flanges and positioned therebetween so as to extend across the interior of the conduit, and means for sealing the space between said flanges against the passage of oil.

5. In an insulated conductor structure, a conduit adapted to contain a body of fluid dielectric material, a conductor extending through said conduit and spaced flexible members supporting said conductor out of contact with said conduit, said members being formed of a fabricated mass of fine glass fibres.

6. In an insulated conductor structure, a conduit adapted to contain a body of fluid dielectric material, a conductor extending through said conduit, and flexible, porous glass textile supports extending across said conduit at spaced intervals and supporting said conductor out of contact with said conduit.

7. In an insulated conductor structure, a sectional conduit adapted to contain a body of fluid dielectric material and including a series of conduit sections arranged in end to end relationship, opposed attachment flanges formed on the ends of said sections, a conductor extending through the conduit and a plurality of spun glass fabric supports for said conductor to maintain it out of contact with the conduit, said supports having their edged portions extending between the adjacent attachment flanges of the conduit, said edge portions being impregnated with a resilient waterproof material, and means for securing the attachment flanges and edge portions of the supports together.

8. In an insulated conductor structure, a sectional conduit adapted to contain a body of fluid dielectric material comprising a series of flanged pipe sections arranged in end to end relationship, a conductor passing through said conduit and supported out of contact therewith by a series of glass fibre supports held between adjacent conduit flanges, said supports being impregnated with a resilient fluidproof material in their flange contacting areas whereby said fibres are protected against crushing and a fluidproof structure is obtained.

LESTER W. W. MORROW.